United States Patent
Oertling et al.

(10) Patent No.: US 10,136,666 B2
(45) Date of Patent: Nov. 27, 2018

(54) DEEP EUTECTIC SOLVENTS AND FLAVOUR GENERATION

(71) Applicant: NESTEC S.A., Vevey (CH)

(72) Inventors: Heiko Oertling, Lausanne (CH); Florian Viton, Lausanne (CH); Candice Marie Menozzi, Belmont-sur-Lausanne (CH); Laurent Forny, Lausanne (CH); Walter Matthey-Doret, Prilly (CH)

(73) Assignee: Nestec S.A., Vevey (CH)

( * ) Notice: Subject to any disclaimer, the term of this patent is extended or adjusted under 35 U.S.C. 154(b) by 224 days.

(21) Appl. No.: 15/023,844

(22) PCT Filed: Sep. 23, 2014

(86) PCT No.: PCT/EP2014/070250
§ 371 (c)(1),
(2) Date: Mar. 22, 2016

(87) PCT Pub. No.: WO2015/044139
PCT Pub. Date: Apr. 2, 2015

(65) Prior Publication Data
US 2016/0242445 A1      Aug. 25, 2016

(30) Foreign Application Priority Data
Sep. 24, 2013    (EP) ..................................... 13185649

(51) Int. Cl.
| | |
|---|---|
| *A23L 27/20* | (2016.01) |
| *A21D 2/14* | (2006.01) |
| *A23L 27/21* | (2016.01) |
| *A23K 20/10* | (2016.01) |
| *A23C 9/156* | (2006.01) |
| *A23G 3/36* | (2006.01) |

(52) U.S. Cl.
CPC .............. *A23L 27/201* (2016.08); *A21D 2/14* (2013.01); *A23L 27/215* (2016.08); *A23C 9/156* (2013.01); *A23G 3/36* (2013.01); *A23K 20/10* (2016.05)

(58) Field of Classification Search
CPC ....... A23L 27/201; A23L 27/215; A21D 2/14; A23K 20/10; A23G 3/36; A23C 9/156
See application file for complete search history.

(56) References Cited

U.S. PATENT DOCUMENTS

| | | | |
|---|---|---|---|
| 3,425,840 | A | 2/1969 | Hunter et al. |
| 4,879,130 | A | 11/1989 | Heyland et al. |
| 2004/0191403 | A1 | 9/2004 | Hansen et al. |
| 2009/0117628 | A1* | 5/2009 | Gorke ...................... C12N 9/00 435/129 |

FOREIGN PATENT DOCUMENTS

| | | | | |
|---|---|---|---|---|
| EP | 0571031 | A2 * | 11/1993 | ......... A23L 27/2052 |
| EP | 1228704 | | 8/2002 | |
| WO | WO-2005096844 | A1 * | 10/2005 | ............ A23L 1/2275 |
| WO | WO-2008148737 | A2 * | 12/2008 | .............. A21D 2/181 |
| WO | WO-2011073035 | A1 * | 6/2011 | ............ A23L 27/215 |

OTHER PUBLICATIONS

Abbas, Q., and Binder, L. 2010. "Synthesis and characterization of choline chloride based binary mixtures." ECS Transactions. vol. 33, pp. 49-59.*
Abbott, A.P., Boothby, D., Capper, G., Davies, D.L., and Rasheed, R.K. 2004. "Deep Eutectic Solvents Formed between Choline Chloride and Carboxylic Acids: Versatile Alternatives to Ionic Liquids." J. Am. Chem. Soc. vol. 126, pp. 9142-9147.*
Imperato, G., Eibler, E., Niedermaier, J., Konig, B. 2005. "Low-melting sugar-urea-salt mixtures as solvents for Diels-Alder reactions." Chem. Commun., pp. 1170-1172.*
Naser, J., Mjalli, F., Jibril, B., Al-Hatmi, S., and Gano, Z. 2013. "Potassium Carbonate as a Salt for Deep Eutectic Solvents." International Journal of Chemical Engineering and Applications. vol. 4, pp. 114-118.*
Abbott et al. "Novel solvent properties of choline chloride/urea mixtures" Chem. Commun. 2003, pp. 70-71, XP002675801.

* cited by examiner

*Primary Examiner* — Nikki H Dees
(74) *Attorney, Agent, or Firm* — K&L Gates LLP

(57) ABSTRACT

The present invention relates to flavor generation. In particular the invention relates to a process for the preparation of a flavor composition. The process comprises forming a deep eutectic solvent, preparing a reaction mixture comprising the deep eutectic solvent and flavor precursors, and heating the reaction mixture to form aroma compounds. The deep eutectic solvent is a liquid based on a combination of at least two compounds solid at 25° C. and comprises water and/or glycerol in an amount insufficient to dissolve all the compounds solid at 25° C. individually, or in an amount such that all the compounds solid at 25° C. are simultaneously saturated at 25° C. The flavor precursors may comprise the compounds solid at 25° C. on which the deep eutectic solvent is based. A further aspect of the invention is a food product comprising the flavor composition obtainable by the process of the invention.

13 Claims, 6 Drawing Sheets

DEEP EUTECTIC SOLVENTS AND FLAVOUR GENERATION

CROSS REFERENCE TO RELATED APPLICATIONS

The present application is a National Stage of International Application No. PCT/EP2014/070250, filed on Sep. 23, 2014, which claims priority to European Patent Application No. 13185649.4, filed Sep. 24, 2013, the entire contents of which are being incorporated herein by reference.

The present invention relates to flavour generation. In particular the invention relates to a process for the preparation of a flavour composition. The process comprises forming a deep eutectic solvent, preparing a reaction mixture comprising the deep eutectic solvent and flavour precursors, and heating the reaction mixture to form aroma compounds. The deep eutectic solvent is a liquid based on a combination of at least two compounds solid at 25° C. and comprises water and/or glycerol in an amount insufficient to dissolve all the compounds solid at 25° C. individually, or in an amount such that all the compounds solid at 25° C. are simultaneously saturated at 25° C. The flavour precursors may comprise the compounds solid at 25° C. on which the deep eutectic solvent is based. A further aspect of the invention is a food product comprising the flavour composition obtainable by the process of the invention.

Reaction flavours, sometimes called process flavours, are complex building blocks that provide similar aroma and taste properties to those found in thermally treated foodstuffs such as meat, chocolate, coffee, caramel, popcorn and bread. Traditionally, flavour compounds are produced in solution, most commonly in a buffered water system at a certain pH, but also in ethanol, glycerol or propylene glycol, as well as for example fat-containing matrices or emulsions. The complex chemistry behind those flavour generating reactions is commonly termed "Maillard" chemistry. This has been described by many sources [M. K. Sucan et al., "Process and Reaction Flavors", ACS Symposium Series 2005, 905, 1-23]. Most commonly the desired key value molecules are generated by mixing a reducing sugar and an amino acid in the respective matrix and heating for a certain period of time. WO2008148737 for example describes adding flavour precursors (amino acids and reducing sugars) directly to ingredients which are then baked to form baked foodstuffs.

Generally, Maillard chemistry is most effective in generating flavour components when the water activity is low. In order to make reaction flavours with a broad range of aroma compounds, and to do so as efficiently as possible, several methods using liquid phases with low water activity have been proposed. U.S. Pat. No. 3,425,840 describes dissolving proline in glycerol or sorbitol and heating to generate fresh-bread aroma. In WO2005096844 process flavours are generated by heating a combination of a carbohydrate source and a nitrogen source in a continuous liquid phase comprising at least 10% of an alpha-hydroxycarboxylic acid. WO201173035 describes reacting flavour precursors in a structured lipid phase with a dispersed polar solvent. EP0571031 describes a process for the preparation of a savoury flavour comprising reacting mono and or di-methyl-3(2H)-furanone with cystein and or hydrogen sulphide. The reaction is carried out in a medium comprising an organic polar solvent such as glycerol or propylene glycol and less than 20% of water.

The non-aqueous solvents and water-activity lowering ingredients solvents used in these approaches are not always suitable for direct incorporation into food products. They may cause changes in texture or processability, or even introduce unwanted flavours themselves. In some cases the aroma compounds need to be isolated from the reaction mixture before being used, which adds process complexity and cost. Usually, when generating a process flavour, a mixture of several key aroma compounds is formed. The aroma compounds formed does not just depend on the nature of the flavour precursor materials, but also on the process used and the reaction matrix. Different aroma compound mixtures provide different sensory characteristics. There is a need to provide new flavour generation processes which can efficiently generate desirable mixtures of aroma compounds, preferably in a reaction mixture suitable for direct incorporation into foodstuffs.

When the Maillard reaction occurs in foods, it often takes place in very localized areas of the foodstuff where the concentration of flavour precursors is high and the amount of solvent such as water is low. An example of such a localized generation of flavour is the crust of bread during baking. However, these conditions are difficult to replicate reproducibly in an industrial preparation of flavour compositions. The solid or semi-solid nature of such reaction mixtures leads to inhomogeneous and inconsistent flavour generation. There is therefore a need to provide processes for the preparation of flavour compositions where the level of liquid solvents such as water is low, and yet the flavour reaction mixture is homogeneous and provides reproducible results.

Deep eutectic solvents are liquids having a melting point that is much lower than the melting points of the compounds which form the eutectic mixture. The deep eutectic phenomenon was described in 2003 for a mixture of choline chloride and urea [A. P. Abbott et al., Chemical Communications, 9, 70-71 (2003)], and many of the first eutectic solvents were based on mixtures of quaternary ammonium salts with hydrogen donors such as amines and carboxylic acids. US2009/0117628 explains how deep eutectic solvents based on strong hydrogen bond donors and metal salts or nitrogen salts can be used for performing enzymatic reactions. A more recent patent, WO2011/155829, describes a process where deep eutectic solvents are used to extract materials from biological material. The deep eutectic solvents of WO2011/155829 include combinations of a naturally occurring organic acid or an inorganic salt with a mono- or dimeric sugar, a sugar alcohol, an amino acid, a di or tri alkanol or a choline derivative. In WO0182890, eutectic mixtures of various amino acids with glycolic acid or disaccharides are proposed for delivery of potentially irritating acids in cosmetic applications.

U.S. Pat. No. 4,388,328 describes a method for encapsulating flavouring agents by melting a mixture of sorbitol, mannitol and saccharin before then cooling the mixture, adding a flavouring agent and crystallizing the mixture. The formation of a eutectic means that volatile flavours can be dispersed into the liquid mixture at lower temperatures and so reduce losses. However, none of the above disclosures propose generating aroma compounds in a deep eutectic solvent.

An object of the present invention is to improve the state of the art and to provide an improved process for the preparation of flavour compositions or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

The present invention provides in a first aspect a process for the preparation of an flavour composition comprising the steps;
a) forming a deep eutectic solvent,
b) preparing a reaction mixture comprising the deep eutectic solvent and flavour precursors,
c) heating the reaction mixture to form aroma compounds, wherein the deep eutectic solvent is a liquid based on a combination of at least two compounds solid at 25° C. and comprises water and/or glycerol in an amount insufficient to dissolve all the compounds solid at 25° C. individually, or in an amount such that all the compounds solid at 25° C. are simultaneously saturated at 25° C., and wherein the flavour precursors may comprise said compounds solid at 25° C. A further aspect of the invention is a food product comprising the flavour composition obtainable by the process of the invention.

It has been surprisingly found by the inventors that deep eutectic mixtures may be used as solvents for reacting flavour precursors. The profile of aroma compounds produced is different from that obtained in conventional solvent systems such as water. For example, reacting xylose and cysteine in a pre-formed deep eutectic solvent based on sodium chloride and fructose generated a significantly different volatile profile with higher levels of aroma compounds such as furfural than when the same components (including sodium chloride and fructose) were simply dissolved in water and reacted. The flavour composition resulting from the reaction in this example of a deep eutectic solvent had enhanced almond-like and milky notes.

The inventors also found that preparing a reaction mixture comprising a deep eutectic solvent provides a more reproducible outcome. For example, reacting a composition with exactly the same quantities of malic acid, β-alanine, sodium hydroxide, xylose, cysteine and water produced a different aroma profile and had a much less variable result when the malic acid and β-alanine were pre-formed into a deep eutectic solvent, than when all the components were simply mixed together.

Figure 1:
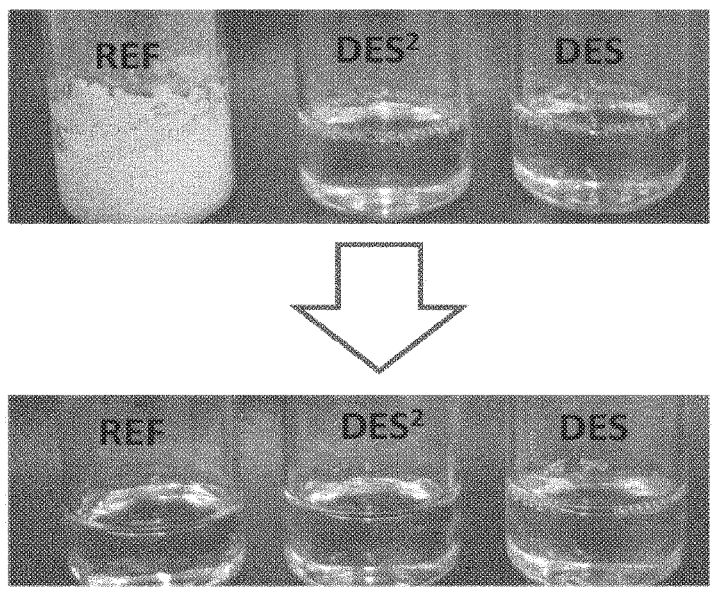
FIG. 1 shows photographs of the reaction mixtures from Example 1 before (top) and after heating (bottom).

The present invention relates in part to a process for the preparation of a flavour composition comprising the steps; a) forming a deep eutectic solvent, b) preparing a reaction mixture comprising the deep eutectic solvent and flavour precursors, c) heating the reaction mixture to form aroma compounds, wherein the deep eutectic solvent is a liquid based on a combination of at least two compounds solid at 25° C. and comprises water and/or glycerol in an amount insufficient to dissolve all the compounds solid at 25° C. individually, or in an amount such that all the compounds solid at 25° C. are simultaneously saturated at 25° C., and wherein the flavour precursors may comprise said compounds solid at 25° C.

A flavour composition is a composition which provides aroma and taste, for example when added to a foodstuff. Flavour compositions obtained by heat treatment of a mixture of ingredients are commonly called process flavours or reaction flavours. Flavour compositions may include molecules which are not aromas themselves but which generate aroma when further processed, for example during baking.

Deep eutectic solvents are liquids. In the context of the present invention, this means that they are liquid at 25° C. under standard atmospheric pressure. Deep eutectic solvents have a melting point that is much lower than the melting points of the compounds which form the eutectic mixture, for example the deep eutectic solvent may have a melting point at least 20° C. lower than the melting points of the compounds which form the eutectic mixture, for example at least 50° C. lower than the melting points of the compounds which form the eutectic mixture. In the process of the invention the deep eutectic solvent is based on a combination of at least two compounds solid at 25° C. The term "solid at 25° C." is used conventionally and refers to the compounds in a substantially pure state and at standard atmospheric pressure. Being solid at 25° C. these materials would not normally be considered an appropriate matrix for flavour generation as it is extremely difficult to evenly disperse flavour precursors in a solid, even in a powder form. An uneven dispersion results in inhomogeneous and variable aroma profiles being generated. However, when the at least two solids are combined to form a deep eutectic solvent, the flow-able nature of the deep eutectic solvent provides a suitable medium in which to dissolve or disperse flavour precursors homogeneously. Surprisingly, the profile of aroma compounds produced by a flavour generation process in which the reaction mixture comprises a deep eutectic solvent is different from the same components without forming the deep eutectic solvent, and is different from that obtained in conventional solvent systems such as water. These differences in aroma profile are advantageous as they lead to desirable and unusual flavour compositions.

Liquid components, for example water or glycerol, may be present in the deep eutectic solvents of the invention. However, these liquid components are generally present in minor amounts. For instance, the liquid components may be present in an amount insufficient to dissolve all of the compounds solid at 25° C. individually, or the liquid components may be present in an amount to simultaneously saturate all the compounds solid at 25° C., the solubility being assessed at 25° C. For example, in a deep eutectic solvent consisting of 40 g water, 72.6 g proline and 23 g rhamnose; 40 g water is insufficient to dissolve all the compounds individually as 72.6 g of proline would not fully dissolve in 20 g water at 25° C. As a further example, in a deep eutectic solvent consisting of 20 g water, 7.2 g sodium chloride and 73 g fructose; 7.2 g sodium chloride and 73 g fructose are simultaneously saturated in 20 g water at 25° C.

The liquid components may be present in an amount insufficient to dissolve any of the compounds solid at 25° C. individually, the solubility being assessed at 25° C. For example, in a deep eutectic solvent consisting of 24 g water, 33 g malic acid and 43 g β-alanine; 24 g of water is insufficient to dissolve any of the compounds individually as neither 33 g malic acid nor 43 g β-alanine would fully dissolve individually in 24 g water at 25° C. It is only when the 24 g water, 33 g malic acid and 43 g β-alanine are all combined that a homogeneous liquid can be formed, being an example of a deep eutectic solvent.

The deep eutectic solvent may be based on a combination of at least two compounds solid at 25° C. and further comprise water and/or glycerol in an amount insufficient to dissolve all the compounds solid at 25° C. individually. The deep eutectic solvent may be based on a combination of at least two compounds solid at 25° C. and further comprise water and/or glycerol in an amount insufficient to dissolve any of the compounds solid at 25° C. individually. The deep eutectic solvent may be based on a combination of at least two compounds solid at 25° C. and further comprise water and/or glycerol in an amount such that all the compounds solid at 25° C. are simultaneously saturated at 25° C. The deep eutectic solvent may consist of at least two compounds solid at 25° C., water and/or glycerol; wherein the total quantity of water and glycerol would be insufficient to dissolve any of the compounds solid at 25° C. individually, or wherein all the compounds solid at 25° C. are simultaneously saturated at 25° C.

The deep eutectic solvent may be a liquid comprising a combination of at least two compounds solid at 25° C. and comprising water and/or glycerol in an amount insufficient to dissolve all the compounds solid at 25° C. individually, or in an amount such that all the compounds solid at 25° C. are simultaneously saturated at 25° C. For example, the deep eutectic solvent may be a liquid comprising at least two compounds solid at 25° C. with no components liquid at 25° C. being present at levels greater than 1 wt. % of the deep eutectic solvent except that the deep eutectic solvent comprises water and/or glycerol in an amount insufficient to dissolve all the compounds solid at 25° C. individually, or in an amount such that all the compounds solid at 25° C. are simultaneously saturated at 25° C. For further example, the deep eutectic solvent may consist of a liquid combination of at least two compounds solid at 25° C. and may further consist of water and/or glycerol in an amount insufficient to dissolve all the compounds solid at 25° C. individually, or in an amount such that all the compounds solid at 25° C. are simultaneously saturated at 25° C.

The water and/or glycerol in the deep eutectic solvent may be less than 50 wt. % of the deep eutectic solvent, for example less than 35 wt. %, for further example less than 25 wt. % of the deep eutectic solvent. For example, the deep eutectic solvent may consist of at least two compounds solid at 25° C., water and/or glycerol; wherein the total quantity of water and glycerol is between 0 and 50 wt. %, for example between 0 and 35 wt. %, for further example between 0 and 25 wt. %.

Heating the reaction mixture to form aroma compounds accelerates the reaction. The aroma profile obtained will vary according to the temperature and time of heating. In the present process the reaction mixture may be heated to a temperature of between 60 and 180° C. The reaction mixture may be heated for a period of 0.1 to 8 hours. An advantage of the process of the invention is that good solubility of flavour precursors can be obtained with low levels of liquid solvents such as water, providing concentrated flavour compositions. In traditional processes with low levels of liquid solvent, high temperatures must be used to dissolve or melt the flavour precursors. With deep eutectic solvents, flavour precursors such as amino acids and reducing sugars can be more easily dissolved at low or zero levels of liquid solvent, allowing lower reaction temperatures to be used. Low temperatures are desirable when generating Maillard compounds due to their volatile nature. Short heating periods and low temperatures avoid losses (sometimes called "strip-off") of desirable aroma compounds. The reaction mixture may be heated at a temperature between 60 and 140° C. for a period of 0.1 to 2 hours. Preferably the reaction mixture is heated in a sealed vessel, or in a vessel where volatiles can be captured and fed back into the reaction.

The deep eutectic solvent may be formed by any of the methods known in the art. For example, the compounds solid at 25° C. may be mixed directly in the solid state, (for example as powders) followed by gentle heating to achieve melting and complete homogenization and then cooling, the resulting deep eutectic solvent remaining liquid at 25° C. An additional liquid component, for example water or glycerol, may be added to the compounds to facilitate eutectic formation. In the case of water, the mixture of compounds solid at 25° C. may be placed in a humid environment and allowed to absorb water until the mixture is observed to liquefy. This has the advantage of incorporating the minimum amount of water necessary for forming the deep eutectic solvent. At a laboratory scale this provides a simple method of identifying a composition forming the desired deep eutectic solvent. Deep eutectic solvents can be formed with no water present and used to generate flavour precursors, but in practice, very low quantities of water are inevitable in normal food grade preparation processes.

The deep eutectic solvent may also be prepared by heating one compound, preferably the one with the lowest melting point, until it melts. Subsequent components can then be mixed into and dissolved in the melted first component. On cooling, the deep eutectic solvent remains liquid at 25° C. This method is more suited to large scale preparation.

For compounds which are not heat stable or where the homogenization process would be very time-consuming, the compounds solid at 25° C. may be dissolved in water, heated and then some or all of the water removed by evaporation under reduced pressure, leaving a deep eutectic solvent.

The flavour precursors of the process of the invention are those well known in the art, for example flavour precursors which take part in the Maillard reaction. The Maillard reaction is most commonly known as the reaction of an amino group, e.g. an amino acid, peptide or protein, with the carbonyl group of a sugar, followed by a complex reaction pathway which results in the formation of a variety of volatiles and non-volatiles. It will be clear to a person skilled person that the flavour precursors must be provided in a combination capable of reacting together, for example an amino acid and a sugar rather than two amino acids or two sugars.

Where the deep eutectic solvent is based on compounds which are themselves flavour precursors they may take part in the reaction to form aroma compounds. Where the deep eutectic solvent is based on at least two compounds solid at 25° C., of which at least two are flavour precursors, it may not be necessary to add further flavour precursors. The flavour precursors may effectively be provided in the deep eutectic solvent as the deep eutectic solvent itself. Where only one of the components of the deep eutectic solvent is a flavour precursor, at least one additional flavour precursor may be required to form a reaction mixture. Flavour precursors may be provided in the deep eutectic solvent by adding one or more flavour precursors to the deep eutectic solvent. The at least two compounds solid at 25° C. on which the deep eutectic solvent is based may or may not be flavour precursors. Flavour precursors may be provided in the deep eutectic solvent by adding two or more flavour precursors to the deep eutectic solvent. For example, the process for the preparation of a flavour composition may comprise the steps of; forming a deep eutectic solvent; and heating the deep eutectic solvent together with optional flavour precursors to form aroma compounds; as long as in the situation where no component of the deep eutectic solvent is a flavour precursor then at least two flavour precursors are heated together with the deep eutectic solvent, and in the situation where one component of the deep eutectic solvent is a flavour precursor then at least one additional flavour precursor is heated together with the deep eutectic solvent, but in the situation where two components of the deep eutectic solvent are flavour precursors then the addition of additional flavour precursors to be heated together with the deep eutectic solvent is optional, and wherein the deep eutectic solvent is based on a combination of at least two compounds solid at 25° C.

The reaction mixture heated in the process of the invention to form aroma compounds may consist of a deep eutectic solvent and optional flavour precursors; as long as in the situation where no component of the deep eutectic solvent is a flavour precursor then at least two flavour precursors are heated together with the deep eutectic solvent, and in the situation where one component of the deep eutectic solvent is a flavour precursor then at least one additional flavour precursor is heated together with the deep eutectic solvent, but in the situation where two components of the deep eutectic solvent are flavour precursors then the addition of additional flavour precursors to be heated together with the deep eutectic solvent is optional.

The flavour composition prepared by the process of the invention may be a "thermal process flavouring" as defined by Regulation (EC) No 1334/2008 of the European Parliament and of the Council of 16 Dec. 2008.

The at least two compounds solid at 25° C. according to the process of the invention may be selected from the group consisting of amino acids; organic acids having 6 carbons or fewer; monosaccharides or disaccharides; sugar alcohols having 12 carbons or fewer; choline chloride; betaine; carnitine; edible salts of sodium, potassium, magnesium or calcium; ribonucleotides; and urea; with the proviso that the two compounds are not both edible salts of sodium, potassium, magnesium or calcium; or are not both ribonucleotides. For example, the at least two compounds solid at 25° C. may comprise two amino acids; an amino acid and an organic acid having 6 carbons or fewer; an amino acid and a mono- or disaccharide; an amino acid and a sugar alcohol having 12 carbons or fewer; an amino acid and choline chloride; an amino acid and carnitine; an amino acid and betaine; an amino acid and urea; an amino acid and a metal salt; an amino acid and a ribonucleotide; two organic acids having 6 carbons or fewer; an organic acid having 6 carbons or fewer and a mono- or disaccharide; an organic acid having 6 carbons or fewer and a sugar alcohol having 12 carbons or fewer; an organic acid having 6 carbons or fewer and choline chloride; an organic acid having 6 carbons or fewer and betaine; an organic acid having 6 carbons or fewer and carnitine; an organic acid having 6 carbons or fewer and urea; an organic acid having 6 carbons or fewer and a metal salt; an organic acid having 6 carbons or fewer and a ribonucleotide; two mono- or disaccharides; a mono- or disaccharide and a sugar alcohol having 12 carbons or fewer; a mono- or disaccharide and choline chloride; a mono- or disaccharide and carnitine; a mono- or disaccharide and betaine; a mono- or disaccharide and urea; a mono- or disaccharide and a metal salt; a mono- or disaccharide and a ribonucleotide; two sugar alcohols having 12 carbons or fewer; a sugar alcohol having 12 carbons or fewer and choline chloride; a sugar alcohol having 12 carbons or fewer and carnitine; a sugar alcohol having 12 carbons or fewer and betaine; a sugar alcohol having 12 carbons or fewer and urea; a sugar alcohol having 12 carbons or fewer and a metal salt; a sugar alcohol having 12 carbons or fewer and a ribonucleotide; choline chloride and urea; choline chloride and a metal salt; choline chloride and a ribonucleotide; urea and a metal salt; urea and a ribonucleotide; or a metal salt and a ribonucleotide. The amino acids may be in their free form or as salts.

Deep eutectic solvents often comprise two components present in an equimolar ratio, although other ratios are also observed. The deep eutectic solvent of the process of the invention may comprise two compounds solid at 25° C. wherein the two components are present in a molar ratio ranging between 1:1 and 8:1, for example between 1:1 and 4:1.

The deep eutectic solvent of the process of the invention may be based on a combination of an amino acid with an organic acid having 6 carbons or fewer; an amino acid with a monosaccharide or disaccharide; or an amino acid with a sugar alcohol having 12 carbons or fewer. Examples of sugar alcohols having 12 carbons or fewer and being solid at 25° C. include xylitol, mannitol, sorbitol, erythritol and maltitol. Sugar alcohols have the general formula $H(HCHO)_{n+1}H$, in contrast to sugars which have the general formula $H(HCHO)_n HCO$.

The deep eutectic solvent of the process of the invention may be based on a combination of a monosaccharide or disaccharide with a sugar alcohol having 12 carbons or fewer. The deep eutectic solvent of the process of the invention may be based on a combination of a metal salt with a monosaccharide, a disaccharide or a sugar alcohol having 12 carbons or fewer. For example, the deep eutectic solvent of the process of the invention may be based on a combination of sodium chloride with fructose, sodium chloride with sucrose, calcium chloride with sucrose, potassium chloride with glucose, sodium dihydrogen phosphate with fructose, sodium hydrogen carbonate with rhamnose, magnesium chloride with maltitol, sodium dihydrogen phosphate with xylitol or sodium dihydrogen phosphate with sorbitol. Preferably the deep eutectic solvent consists of materials which are suitable and safe for use in food.

The deep eutectic solvent of the process of the invention may be based on a combination of β-alanine with malic acid; betaine with rhamnose; rhamnose with sorbitol; rhamnose with proline; xylose with cysteine; sorbitol with proline; sorbitol with lysine; sorbitol with cysteine; xylitol with proline; xylitol with lysine or sodium chloride with fructose. In the context of the present invention, betaine refers to trimethylglycine, sometimes called glycine betaine.

The deep eutectic solvent of the process of the invention may be a liquid consisting of water and at least two compounds solid at 25° C., two of the compounds solid at 25° C. being selected from the group consisting of β-alanine with malic acid; betaine with rhamnose; rhamnose with proline; sorbitol with proline; sodium chloride with fructose; β-alanine with sorbitol; betaine with sucrose; betaine with sorbitol; choline chloride with sucrose and choline chloride with sorbitol, wherein the water is present in an amount insufficient to dissolve the two compounds solid at 25° C. individually, or in an amount such that the two compounds solid at 25° C. are simultaneously saturated at 25° C. For example a deep eutectic solvent may be formed by mixing 47 g β-alanine, 149 g sorbitol and 60 g of water to form a liquid. From literature values only about 33 g β-alanine would dissolve in 60 g water so the solubility of β-alanine in water is not high enough for 47 g β-alanine to dissolve in 60 g water. However in the presence of the sorbitol the mixture can form a liquid, a deep eutectic solvent. The melting point of this deep eutectic solvent is below −40° C., so it is at least 40° C. lower than the lowest melting point of the compounds which form the deep eutectic solvent (water 0° C., sorbitol 95° C. and β-alanine 207° C.). The flavour precursors of the process of the invention may comprise at least one polyol with at least one amino compound selected from the group consisting of amino acids, amino acid derivatives and peptides. An amino acid derivative is a compound that is derived from an amino acid compound by some chemical process. An example of an amino acid derivative is dihydroxyphenylalanine, a beta-hydroxylated derivative of phenylalanine. The at least one amino compound may be an amino acid.

The at least one amino compound may selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures of these. Such amino compounds are particularly suitable as flavour precursors as they generate a range of aromas when reacted with polyols and are edible.

The at least one polyol comprised within the flavour precursors of the process of the invention may be a reducing sugar. A reducing sugar is any sugar that either has an aldehyde group or is capable of forming one in solution through isomerism. Reducing sugars include aldoses or ketoses such as glucose, fructose, maltose, lactose, glyceraldehyde, dihydoxyacetone, arabinose, xylose, ribose, mannose, erythrose, threose, and galactose. The at least one polyol comprised within the flavour precursors of the process of the invention may be an alkane polyol. Alkane polyols are known to react with amino compounds such as proline to form aromas [U.S. Pat. No. 3,425,840]. Suitable alkane polyols include for example glycerol, erythritol, xylitol, ribitol, sorbitol, dulcitol, mannitol, isomalt, maltitol and lactitol. The at least one polyol comprised within the flavour precursors of the process of the invention may be selected from the group consisting of glycerol; sorbitol; glucuronic acid; 5-keto-gluconic acid; galacturonic acid; iduronic acid; maltodextrin; glucose syrup; rhamnose; xylose; glucose; fructose; sucrose; lactose; maltose, xylitol, maltitol, erythritol, mannitol and mixtures of these.

As previously discussed, the flavour precursors may comprise the compounds solid at 25° C. on which the deep eutectic solvent is based. For example, the deep eutectic solvent may comprise rhamnose, fructose, lysine HCl and glycine.

As discussed above, forming solid components into a deep eutectic solvent provides a more reproducible outcome for generating aromas. Surprisingly, this advantage also occurs when further liquid components are added to the reaction mixture before heating. Reaction mixtures where a liquid solvent has been added to the deep eutectic solvent may provide a more reproducible outcome than a reaction mixture with the same overall composition, but where the reaction mixture was not formed from a deep eutectic solvent. As variability in the manufacture of flavour compositions has a significant effect on product quality and consistency, being able to generate aromas more reproducibly is beneficial. In the process of the invention a liquid solvent may be added to the reaction mixture before heating, the liquid solvent being selected from the group consisting of water, glycerol, ethanol, polyethylene glycol or mixtures of these. The liquid solvent may be water or glycerol.

Reaction mixtures where a liquid solvent has been added to a deep eutectic solvent may provide a lower viscosity composition than a reaction mixture with the same overall composition, but where the reaction mixture was not formed from a deep eutectic solvent. Being less viscous is advantageous when the flavour composition is used in products, as it makes it easier to incorporate the flavour composition in another material without having to dilute with a solvent. Diluting with a solvent would reduce the impact of the flavour.

Some aromas are preferentially produced under basic conditions; accordingly the reaction mixture of the process of the invention may further comprise an alkali. The alkali may be for example sodium hydroxide, potassium hydroxide, sodium hydrogen carbonate or sodium hydrogen sulphite. The alkali may be disodium hydrogen phosphate. The alkali may be comprised within a buffer solution such as a phosphate buffer ($NaH_2PO_4/Na_2HPO_4$). Providing sulphur compounds in the reaction mixture may be important for the generation of certain aromas, especially meaty aromas. Some amino acids such as cysteine already contain sulphur, but it may be advantageous to add further sulphur containing compounds. The flavour precursors of the process of the invention may further comprise a source of sulphur, for example ammonium sulphide.

An aspect of the invention is a food product comprising the flavour composition obtainable by the process of the invention. The flavour composition prepared by the process of the invention is preferably formed from components which are all food grade. It is advantageous not to have to remove any non-food grade material, for example a non-food grade solvent, before using the flavour composition in a foodstuff. By using a deep eutectic solvent for preparing a flavour composition the flavour composition may be highly concentrated. For example, it may have low levels of water. The flavour composition may be added directly to a finished foodstuff, for example as a tastant sprayed onto extruded dog food, or the flavour composition may be incorporated as an ingredient in a part-finished product which is further processed, for example being added to a wafer batter before baking. The flavour composition may develop additional aroma compounds during further processing of the foodstuff. The food product of the invention may be a bakery product, a pet food, a dairy product, a confectionery product, a cereal product (for example a breakfast cereal) or a culinary product. Culinary products are food compositions typically prepared or used in kitchens. Culinary products which may comprise the flavour composition according to the invention include soups, sauces, bouillon, liquid seasonings and prepared meals. The dairy products may be for example milk-based powders, ice creams, cheese, fermented milks, and yogurt.

Those skilled in the art will understand that they can freely combine all features of the present invention disclosed herein. In particular, features described for the process of the present invention may be combined with the product of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

EXAMPLES

Example 1: Preparation of Flavoured Wafer Using Deep Eutectic Solvents Based on Proline, Rhamnose and Sorbitol Deep Eutectic Solvent Reaction Mixtures A deep eutectic solvent consisting of proline and sorbitol was prepared by stirring approximately 3.63 g proline (Ajinomoto, 0.031 mol) with 5.5 g sorbitol (Aldrich, 0.030 mol) in 2 g water. NMR was used to determine the molar ratio of proline and sorbitol in the liquid. $^1$H NMR (360.13 MHz) spectra were recorded on a Bruker DPX-360 spectrometer equipped with a broad-band multinuclear z gradient probehead. The chemical shifts (ppm) are expressed with respect to an internal reference (TMS or TSP). Molar ratio was calculated by integrating protons from proline and sorbitol. The liquid was a deep eutectic solvent consisting of proline and sorbitol at a molar ratio of 50/50 with 18% $H_2O$. Sniffing the deep eutectic solvent confirmed that there had been no change in aroma during the process of forming the deep eutectic solvent. Note that neither 5.5 g sorbitol nor 3.63 g proline would not have dissolved in 2 g water. It is only in combination that liquid eutectic mixture is formed.

A deep eutectic solvent consisting of rhamnose and proline was prepared by stirring 2.3 g rhamnose (Merck, 0.014 mol) with 7.26 g proline (Ajinomoto, 0.063 mol) in 4 g water for 1 day. The resulting liquid was weighed to determine water uptake and the molar ratio determined by NMR as above. The liquid was a deep eutectic solvent consisting of rhamnose and proline at a molar ratio of 18/82 with 29.50% $H_2O$. Sniffing the deep eutectic solvent confirmed that there had been no change in aroma during this process. Note that proline would not have dissolved in that quantity of water alone (concentration above maximum solubility at 25° C.). It is only in combination that a liquid eutectic mixture is formed.

Three reaction mixtures were prepared before being heated in a closed vessel for 1 hour at 120° C. and then cooled down to room temperature. The three mixtures were:
Reference Sample REF: Proline (273 mg) and rhamnose (27 mg) were added to sorbitol (9843 mg) and water (Vittel, 1640 mg).

Sample DES: 840 mg of DES proline/sorbitol (molar ratio 50/50, 18% $H_2O$) and rhamnose (27 mg) were added to a sorbitol syrup (10% water, 10473 mg) and water (Vittel, 442 mg).

Sample $DES^2$: 578 mg of DES proline/sorbitol (molar ratio 50/50, 18% $H_2O$) and 158 mg DES rhamnose/proline (molar ratio 18/82, 29.50% $H_2O$) were added to a sorbitol syrup (10% water, 9985 mg) and water (Vittel, 491 mg).

The components of sample REF did not dissolve before heating (see FIG. 1). Reaction mixtures DES and $DES^2$ were liquids even before heating and therefore were more homogeneous than REF. After returning to room temperature, samples DES and $DES^2$ were observed to be less viscous than the sample REF. Being less viscous is advantageous when the flavour composition is used in products, as it makes it easier to incorporate the flavour composition in another material without having to dilute with a solvent. Diluting with a solvent would reduce the impact of the flavour.

Wafers

A series of wafers were produced containing the flavour compositions prepared above. To make the wafer batter; wheat flour, sugar and a pinch of salt were mixed in a Hobart mixer (with planetary action whisk) for 1 min. In parallel, melted coconut fat was mixed with water (Vittel) heated at 40° C., and the resulting mixture was slowly added over 2 min to the Hobart mixer containing the mixture of wheat flour/sugar while mixing. Different pre-reacted flavor compositions were incorporated into the batter prior to baking to form the different test samples described below. 40 g of the batter was poured onto a wafer baking iron (dimension 18×18 cm, Hebenstreit—Germany). The baking conditions were 180° C. for 90 s.

Test and reference wafers were produced according to the following recipes:

| Ingredient | Reference Wafer | Test Wafer DES | Test Wafer DES-2 |
| --- | --- | --- | --- |
| Wheat flour | 33.90 | 33.99 | 34.03 |
| Sugar | 10.65 | 10.68 | 10.69 |
| Coconut Fat | 12.59 | 12.62 | 12.64 |
| Vittel water | 40.46 | 40.58 | 40.63 |
| Additional Ingredients | | | |
| Reference Sample REF | 2.40 | | |
| Sample DES | | 2.13 | |
| Sample $DES^2$ | | | 2.01 |
| Total | 100 | 100 | 100 |

Preparation of Wafer Samples for Volatile Compounds Analysis 2 g of wafer (pieces cut from the whole wafer) were placed in a 20 mL silylated glass vial and were crushed by hand with a small pestle. 1 mL of saturated solution in NaCl and 0.5 µl a solution of 1-pentanol in MeOH (0.5 g/L) was added and used as internal standard for the relative quantification.

Volatile Analysis of Wafer Samples

The sample vials were transported by an auto-sampler to a Gerstel incubator for sample equilibrium at 30° C. for 15 min with stirring. The headspace was sampled by introduction of the SPME fibre into the vial (SPME Fiber PDMS-DVB 65 µm 23 gauge needle, Supelco No 57345-U) at 30° C. After 10 min adsorption, the fibre was transported into the injector port in splitless mode at 250° C. for 5 min to desorb and transfer volatile compounds into the chromatographic column. After 3 min the injector split ratio was increased to 50 to clean the fibre. GC separation was performed on a HP-5MS column of 30 m length, 0.25 mm ID and 0.25 μm film thickness (Agilent No 19091S-433). The oven (Agilent Technologies 7890A GC oven) temperature program was: 30° C. during 3 min, then heated at 6° C./min until 240° C., and held for 15 min. The GC was coupled to a MS (Agilent Technologies 5975C) mass selective detector operating in EI/TIC (70 eV) mode.

Figure 2:
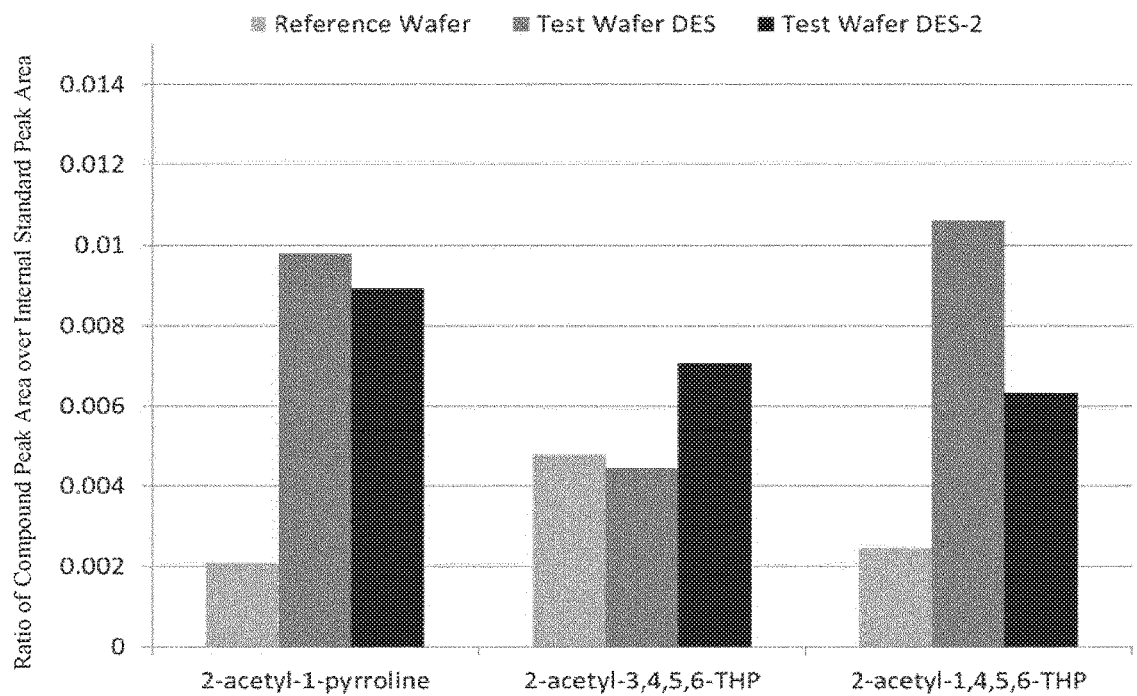
FIG. 2 shows the relative quantification of 2-acetyl-1-pyrroline, 2-acetyl-3,4,5,6-tetrahydropyridine (2-acetyl-3,4,5,6-THP) and 2-acetyl-1,4,5,6-tetrahydropyridine (2-acetyl-1,4,5,6-THP) in the flavoured wafers of Example 1. The y axis is the ratio of the compound peak area over the internal standard peak area.
Figure 3:
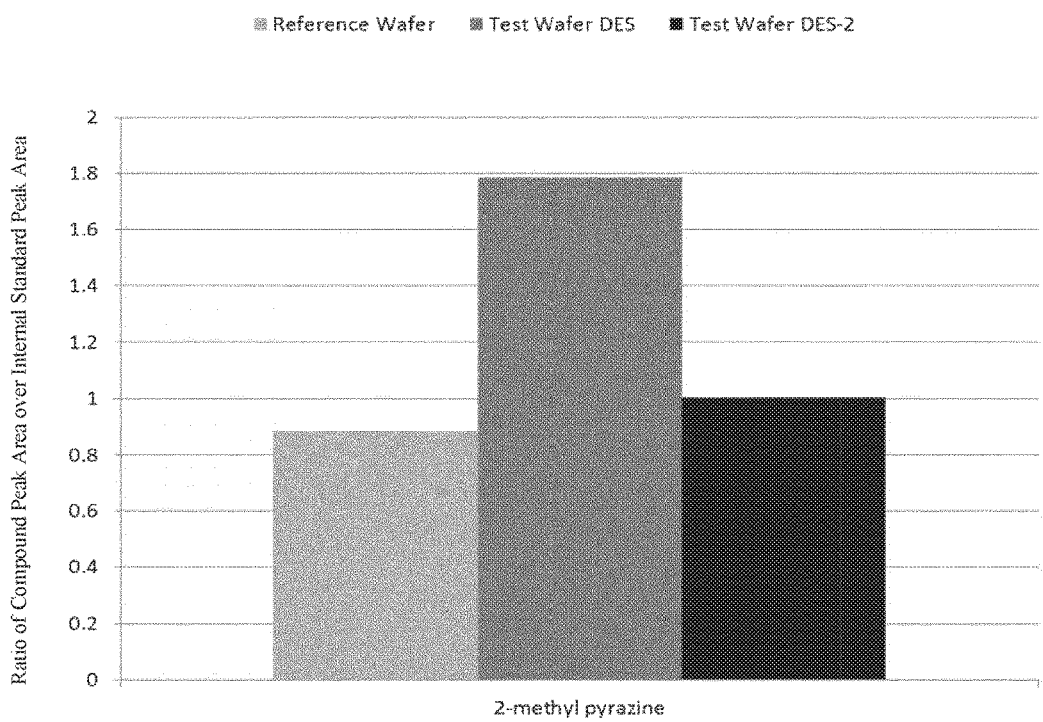
FIG. 3 shows the relative quantification of 2-methylpyrazine in flavoured wafers from Example 1. The y-axis is the ratio of the compound peak area over the internal standard peak area.

FIGS. 2 and 3 show the quantities of volatile compounds in the flavoured wafers. The test wafers prepared from deep eutectic solvents of rhamnose/proline and sorbitol/proline led to the higher generation of different aroma active molecules compared to the reference wafers. These compounds included pyrazines and key aroma molecules specifically generated from proline which provide an important contribution to roasted and baked aromas.

Sensory Evaluation of Wafer Samples

Sensory evaluation of reference wafer and test wafers were carried out with 10 panelists. The panelists were asked to described aroma, flavor and texture in mouth for each wafer. Sensory results are described in the table below:

| Samples | Sensory description |
|---|---|
| Reference wafer | Overall plain aroma profile with baked notes |
| Test wafer DES | Biscuit and roasted aroma, sweet and salty taste. |
| Test wafer DES-2 | Biscuit and caramel aroma, sweet taste. Biscuit and bread-like aroma notes in mouth. |

Reference wafer and test wafers were clearly found different by the panelists. Biscuit and roasted flavors were more intensively perceived in test wafers.

Example 2: Flavour Compositions Using a Deep Eutectic Solvent Based on Malic Acid and β-Alanine A deep eutectic solvent consisting of malic acid, β-alanine and water was prepared by mixing 9 g malic acid (Sigma, 0.067 mol) with 12 g β-alanine (Sigma, 0.135 mol) in a mortar. The powder was stored in a 98% humidity chamber for 7 days (Duran dessicator equipped with aqueous saturated solution of $K_2SO_4$). Sniffing the deep eutectic solvent confirmed that there had been no change in aroma during this process. The resulting liquid was weighed to determine water uptake and the molar ratio determined by NMR as above. The liquid was a deep eutectic solvent consisting of malic acid and β-alanine (molar ratio 33/67) with 23.9% water by weight. Note that neither the malic acid nor the β-alanine would have dissolved in that quantity of water on their own. It is only in combination that a liquid eutectic mixture is formed.

Three reaction mixtures were prepared before being heated in a closed vessel for 1 hour at 120° C. and then cooled down to room temperature. The three mixtures were:
Reference Sample (REF-MA): Malic acid (326 mg), β-alanine (435 mg), proline (100 mg) and glucose (Merck, 150 mg) were added to glycerol (3000 mg) and water (Vittel, 1239 mg).
Sample MA-1: DES Malic acid/β-alanine (molar ratio 33/67, 23.9% $H_2O$ w., 1000 mg), proline (100 mg) and glucose (150 mg) were added to glycerol (3000 mg) and water (Vittel, 1000 mg).
Sample MA-2: DES Malic acid/β-alanine (molar ratio 33/67, 23.9% $H_2O$ w., 1000 mg), proline (100 mg) and glucose (150 mg) were added to glycerol (3000 mg).

After cooling down the closed vessel to room temperature, samples of each flavor matrice were harmonized in overall composition to be able to compare the volatile profile of flavor systems and avoid bias due to the media. Then, 10 μl a solution of 1-pentanol in MeOH (0.5 g/L) was added and used as internal standard for the relative quantification.

Figure 4:
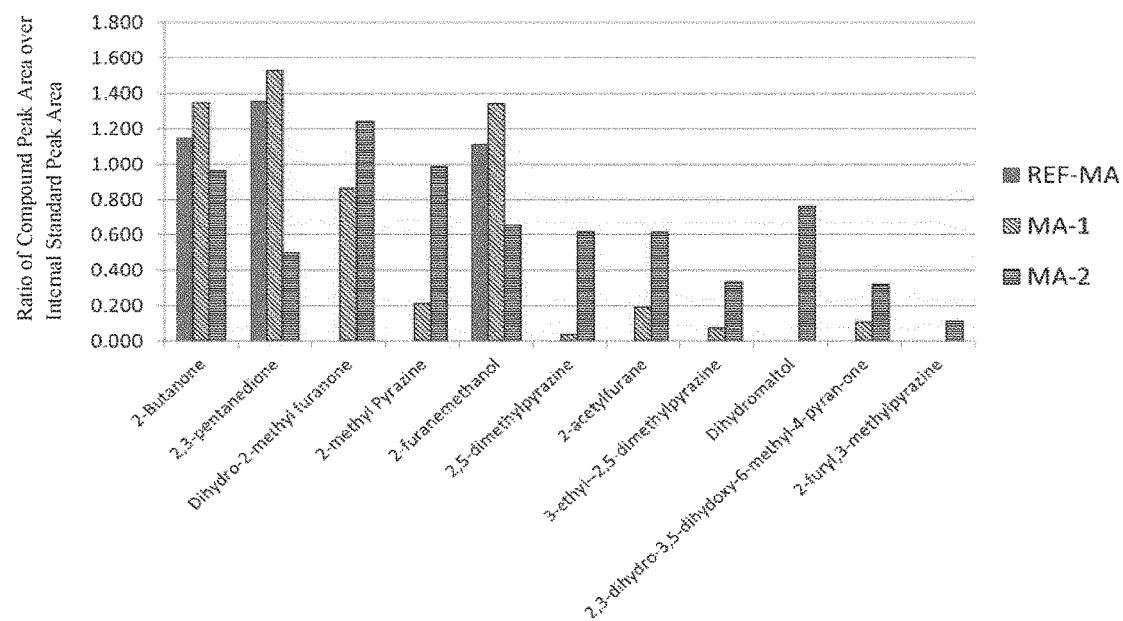
FIG. 4 shows the relative quantification of volatile compounds generated by heating the reaction mixtures of Example 2. The y axis is the ratio of the compound peak area over the internal standard peak area.

Volatile analysis was performed as in Example 1. FIG. 4 shows the quantities of volatile compounds in the flavour compositions. The reaction mixture formed from the β-alanine and malic acid deep eutectic solvent led to the generation of different aroma active molecules compared to the reference REF-MA. These compounds included pyrazines and key aroma molecules specifically generated from proline which provide an important contribution to roasted and baked aromas.

Example 3: Flavour Compositions Using a Deep Eutectic Solvent Based on Rhamnose and Betaine A deep eutectic solvent consisting of rhamnose, betaine (trimethylglycine) and water was prepared by mixing 10.5 g rhamnose monohydrate (Merck, 0.057 mol) with 10.5 g betaine (Sigma, 0.089 mol) in a mortar. The powder was stored in a 98% humidity chamber for 9 days (Duran desiccator equipped with aqueous saturated solution of $K_2SO_4$). Sniffing the deep eutectic solvent confirmed that there had been no change in aroma during this process. The resulting liquid was weighed to determine water uptake and the molar ratio determined by NMR as above. The liquid was a deep eutectic solvent consisting of rhamnose and betaine (molar ratio 39/61) with 31% water by weight. Note that neither the rhamnose nor the betaine would have dissolved in that quantity of water on their own. It is only in combination that a liquid eutectic mixture is formed.

Two reaction mixtures were prepared before being heated in a closed vessel for 1 hour at 120° C. and then cooled down to room temperature. The two mixtures were:
Reference Sample (REF-BR): Rhamnose (345 mg), betaine (345 mg), proline (100 mg) and glucose (150 mg) were added to water (Vittel, 1310 mg).
Sample BR-1: DES rhamnose/betaine (molar ratio 39/61, 31% $H_2O$ w., 1000 mg), proline (100 mg) and glucose (150 mg) were added to water (Vittel, 1000 mg).

Figure 5:
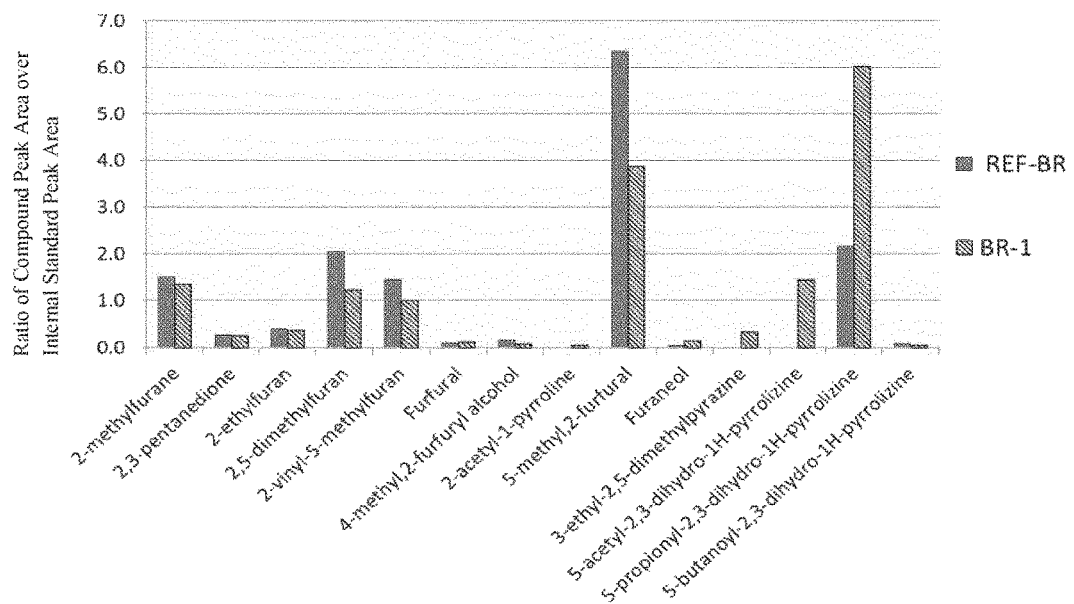
FIG. 5 shows the relative quantification of volatile compounds generated by heating the reaction mixtures of Example 3. The y axis is the ratio of the compound peak area over the internal standard peak area.

The flavour compositions were analyzed as in Example 2. FIG. 5 summarizes the results of volatile analysis carried out on the flavour compositions. The reaction mixture formed from the rhamnose and betaine deep eutectic solvent (sample BR-1) led to the generation of different aroma active molecules compared to the reference REF-BR. These compounds included pyrazines and key aroma molecules specifically generated from proline which provide an important contribution to roasted and baked aromas.

Example 4: Savoury Flavour Compositions Using a Deep Eutectic Solvent Based on Malic Acid and β-Alanine Three reaction mixtures were prepared, heated and analysed as in the examples above:
Reference Sample (REF-MA_meat): Malic acid (654 mg), β-alanine (872 mg), NaOH (Merck, 50 mg), xylose (Sigma, 450 mg) and cysteine (Fluka, 176 mg) were added to water (Vittel, 2480 mg).
Sample MA-1_meat: DES malic acid/β-alanine (molar ratio 33/67, 24% $H_2O$ w., 2000 mg), NaOH (50 mg), xylose (450 mg) and cysteine (176 mg) were added to water (Vittel, 2000 mg).

Sample MA-2_meat: NaOH (50 mg), xylose (450 mg) and cysteine (176 mg) were added to DES malic acid/β-alanine (molar ratio 33/67, 24% $H_2O$ w., 2000 mg).

Figure 6:
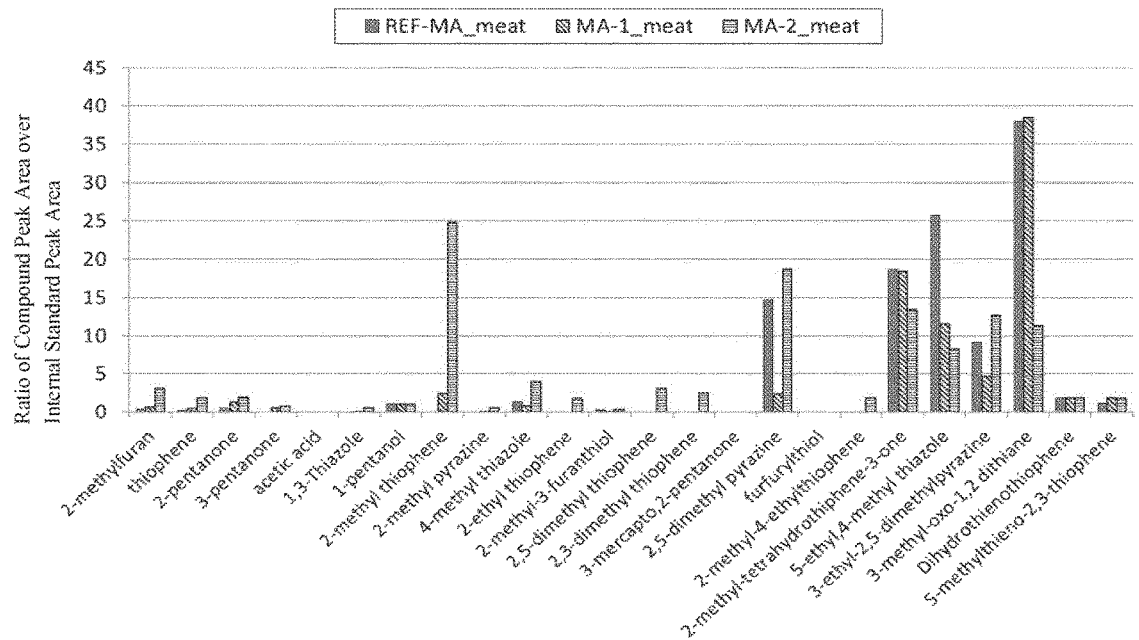
FIG. 6 shows the relative quantification of volatile compounds generated by heating the reaction mixtures of Example 4. The y axis is the ratio of the compound peak area over the internal standard peak area
Figure 7:
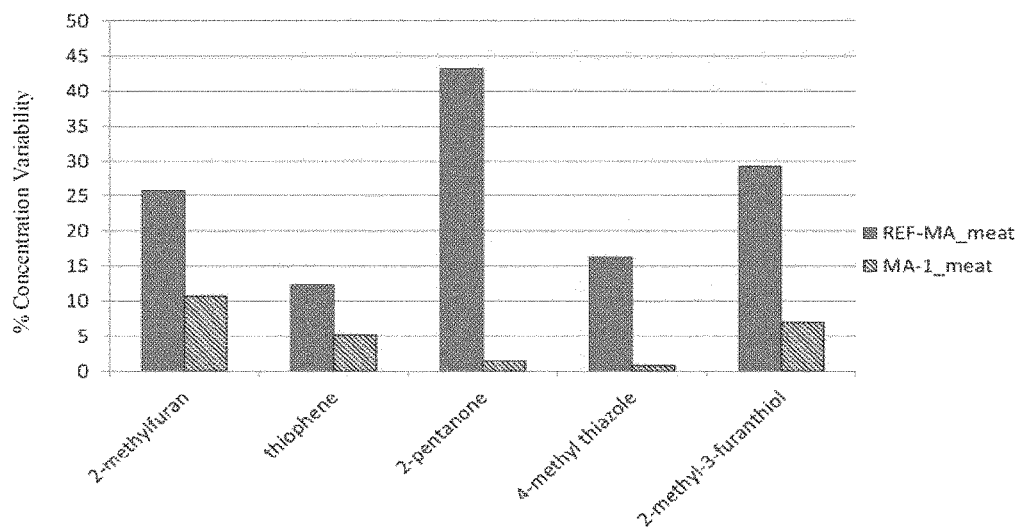
FIG. 7 shows the % concentration variability in volatile concentrations for REF-MA_meat and MA-1_meat of Example 4 calculated over 3 replicates.

FIG. 6 depicts the results of volatile analysis performed on the resulting flavour compositions. The process was repeated for the reference and for MA-1_meat to obtain 3 replicates. FIG. 7 shows the variability of flavour systems in terms of volatile concentration. The reaction mixture formed from the malic acid and β-alanine deep eutectic solvent, MA-1_meat, provided a more consistent aroma profile over 3 replicates than the reaction mixture where no deep eutectic solvent was formed.

Example 5: Savoury Flavour Compositions Using a Deep Eutectic Solvent Based on Sodium Chloride and Fructose A deep eutectic solvent consisting of sodium chloride, fructose and water was prepared by stirring 7.2 g sodium chloride (Merck, 0.123 mol) with 72.7 g fructose (Sigma, 0.400 mol) and water (20 g) for 1 day. The resulting liquid was a deep eutectic solvent consisting of sodium chloride and fructose (molar ratio 23.55/76.45) with 20% water by weight. Note that sodium chloride and fructose are simultaneously saturated in water in this deep eutectic solvent.

Three reaction mixtures were prepared before being heated in a closed vessel for 1 hour at 120° C. and then cooled down to room temperature. The three mixtures were:
Reference Sample Na-Fru: NaCl (144 mg), fructose (1455 mg), xylose (Sigma, 450 mg) and cysteine (Fluka, 176 mg) were added to water (Vittel, 2440 mg).
Sample Na-Fru_DES: DES NaCl/fructose (molar ratio 23.55/76.45, 20% $H_2O$ w., 2000 mg), xylose (450 mg) and cysteine (176 mg) were added to Water (Vittel, 2000 mg).
Sample Na-Fru_DES_2: Xylose (450 mg) and cysteine (176 mg) were added to DES NaCl/fructose (molar ratio 23.55/76.45, 20% $H_2O$ w., 2000 mg).

Figure 8:
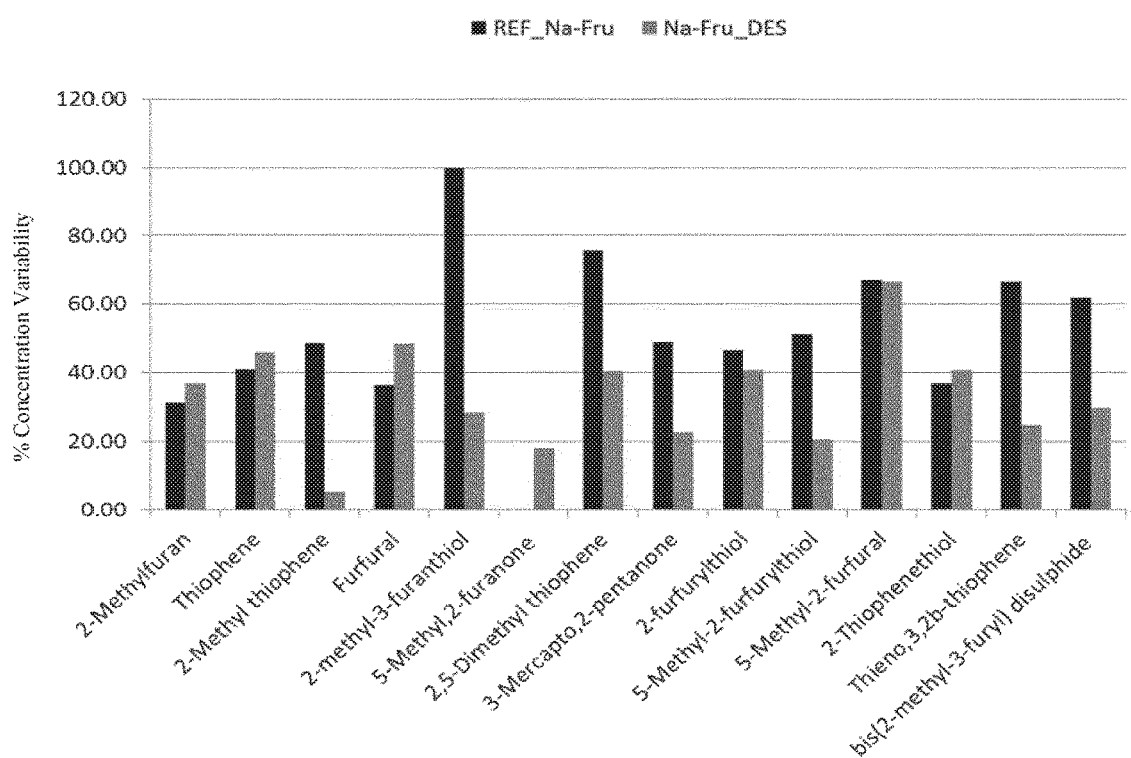
FIG. 8 shows the % concentration variability in volatile concentrations for Na-Fru/REF and Na-Fru/DES of Example 5 calculated over 3 replicates.

The flavour compositions were analyzed as in Example 2. The table below summarizes the results of volatile analysis carried out on the flavour compositions. Na-Fru_DES_2 gave a very different volatile profile with a much higher concentration of furfural, 5-methyl-2-furfural and thieno-3,2b-thiophene in the system. There was no significant difference in terms of volatile concentration between samples Na-Fru, and Na-Fru_DES, but the reference sample Na-Fru led to a higher variability of flavour systems in terms of volatile concentration while Na-Fru_DES provided more consistent aroma profile (FIG. 8).

TABLE

Results of volatile analysis in flavour systems of Example 5

| Molecules | Average Ratio [Cpd Area/Std Area] | | |
|---|---|---|---|
| | REF_Na-Fru | Na-Fru_DES | Na-Fru_DES_2 |
| 2-Methylfuran | 0.43 | 0.95 | 0.73 |
| Thiophene | 0.04 | 0.16 | 9.38 |
| 2-Methyl thiophene | 0.40 | 1.08 | 3.35 |
| Furfural | 8.96 | 31.92 | 2356.54 |
| 2-methyl-3-furanthiol | 10.57 | 8.73 | 0.36 |
| 5-Methyl,2-furanone | 0.00 | 2.34 | 6.56 |
| 2,5-Dimethyl thiophene | 0.37 | 0.57 | 0.00 |
| 3-Mercapto,2-pentanone | 0.52 | 0.55 | 0.08 |
| 2-furfurylthiol | 29.01 | 37.90 | 0.36 |
| 5-Methyl-2-furfurylthiol | 7.80 | 13.40 | 2.51 |
| 5-Methyl-2-furfural | 0.20 | 1.00 | 70.78 |
| 2-Thiophenethiol | 5.36 | 5.44 | 0.00 |
| Thieno,3,2b-thiophene | 0.78 | 2.55 | 83.00 |
| bis (2-methyl-3-furyl) disulphide | 1.64 | 0.74 | 0.00 |

Three reaction mixtures were evaluated by sniffing by a group of untrained people. The reference sample Na-Fru was perceived as strongly grilled, Na-Fru_DES as grilled chicken and Na-Fru_DES_2 as milky, sweet and almond-like.

Example 6: Effect of Pre-Forming a Deep Eutectic Solvent

A deep eutectic solvent was prepared by combining 0.57 g rhamnose, 1.69 g fructose, 1.18 g lysine HCl, 0.47 g glycine, 0.106 g disodium hydrogenphosphate and 2 g water. The components were were mixed using Ultraturax stirrer until the formation of a homogeneous liquid. This liquid was a deep eutectic solvent as the maximum solubility of glycine at 25° C. was found to be 213 g/L, so taken individually 0.47 g glycine would not dissolve in 2 g water. No additional flavour precursors were added as rhamnose, fructose, lysine and glycine are not only compounds solid at 25° C. on which the deep eutectic solvent is based but also flavour precursors. Accordingly the formation of the deep eutectic solvent also acted as the preparation of a reaction mixture comprising a deep eutectic solvent and flavour precursors. 0.8 g water was added to 0.547 g of the reaction mixture together with 3.2 g sunflower oil before being heated in a closed vessel at 120° C. and then cooled down to room temperature (sample DES6). Sunflower oil is used to capture the aroma compounds formed which are oil soluble. (The deep eutectic solvent reaction mixture was not dissolved in the oil.)

For comparison, the same components; 0.57 g rhamnose, 1.69 g fructose, 1.18 g lysine HCl, 0.47 g glycine, 0.106 g disodium hydrogenphosphate were mixed with 10.8 g water to form an aqueous solution. As all components are soluble individually in that quantity of water, there was no step in which a deep eutectic solvent was formed. 1.347 g of the solution was combined with 3.2 g sunflower oil and heated in a closed vessel at 120° C. and then cooled down to room temperature (sample DIL6). The two mixtures, DES6 and DIL6 contained exactly the same quantities of components including water; they differed solely in their method of preparation.

Volatile analysis was performed using GC-MS/SPME (Solid Phase Micro Extraction): The reaction sample vials were transported by the auto-sampler to the Gerstel incubator for sample equilibrium at 30° C. for 15 min with stirring. The headspace was sampled by introduction of the SPME fibre into the vial (SPME Fiber Polydimethylsiloxane/Divinylbenzene PDMS-DVB 65 μm 23 gauge needle, Supelco No 57345-U) at 30° C. After 10 min adsorption, the fibre was transported into the injector port in splitless mode at 250° C. for 5 min to desorb and transfer volatile compounds into the chromatographic column. The injector was equipped with a 0.75 mm i.d. liner (Supelco). GC separation was performed on a DB-1701 HP-5MS column of 30 m length, 0.25 mm ID and 0.25 μm film thickness (Agilent No 1220732). The oven (Agilent Technologies 6890A GC oven) temperature program was: 30° C. during 3 min, then heated at 6° C./min until 240° C., and held for 15 min. The GC was coupled to a MS (Agilent Technologies 5973) mass selective detector operating in EI/TIC (70 eV) mode.

The volatiles produced after 10 minutes at 120° C. are shown in the table below (a ✓ indicates the presence of the compound):

| Volatile compounds | Deep eutectic formed (DES6) | Diluted, no deep eutectic (DIL6) |
|---|---|---|
| 2,3-Butanedione | ✓ | ✓ |
| 2-5-Dimetylfuran | ✓ | ✓ |
| 2,3 Pentanedione | ✓ | ✓ |
| Formic acid | ✓ | |
| Pyrazine | | ✓ |
| Acetic acid | ✓ | ✓ |
| 1-hydroxy-2-propanone | ✓ | ✓ |
| Methylpyrazine | ✓ | ✓ |
| 1-Hydroxy-2-butanone | ✓ | |
| 2-Furancarboxaldehyde | ✓ | ✓ |
| 2,5-Dimethylpyrazine | ✓ | ✓ |
| 5-Methyl-2,3-hydrofuranone | ✓ | ✓ |
| alpha-Furfuryl alcohol | ✓ | |
| 2-Ethyl-5-methylpyrazine | ✓ | ✓ |
| 2,5-Dimethyl 3(2H)-furanone | ✓ | |
| 5 Methylfurfural | ✓ | ✓ |
| 2(5H)-Furanone | ✓ | |
| 2-Furanone | ✓ | |
| 2-Acetyl-5-methylfurane | ✓ | |
| 2-Hydroxy-3-methyl-2-Cyclopentenone | ✓ | |
| Furaneol | ✓ | ✓ |
| 2,3/5,6-dihydro-3,5-dihydroxy-2-methyl-pyran-4-one | ✓ | |
| Me-1H-Pyrrole-2-carboxaldehyde | ✓ | |

It can be seen that, even though the composition of the two mixtures was identical, the formation of a deep eutectic before adding the additional water in DES6 leads to a greater number of flavour molecules being produced when the reaction mixtures are heated.

The progress of the reaction with the different mixtures was monitored by measuring the amount of rhamnose remaining after different heating times. The rhamnose was measured as follows: 1 mL of the reaction medium was taken and oil removed by extraction with pentane (8 mL×3). The aqueous layers were centrifuged at 3400 t/min for 20 min at 8° C. The resulting solution was then diluted (45 μL for 100 mL). Residual rhamnose was quantified by high performance ion-exchange chromatography using an ICS-5000 ion chromatography system from Dionex (Thermo Fisher Scientific, 81 Wyman Street, Waltham, Mass. 02454, US) equipped with an AS-50 autosampler, OH− eluent generator, a suppressor, a column oven and a conductivity detector. The column was a Carbopac (PA1, 2×250 mm) coupled with a guard column (2×50 mm), both purchased from Dionex. The eluent was deionised water and the hydroxide (OH−) was produced by an Eluent Generator (KOH cartridge EGCIII) and released in the flow through a membrane (0.4 mL/min). Elution was an isocratic elution, fixed at 20 mM [OH−] from 0 to 49 min. Rhamnose was identified by comparing retention time with that of corresponding reference standard and was quantified using calibration curve.

Figure 9:
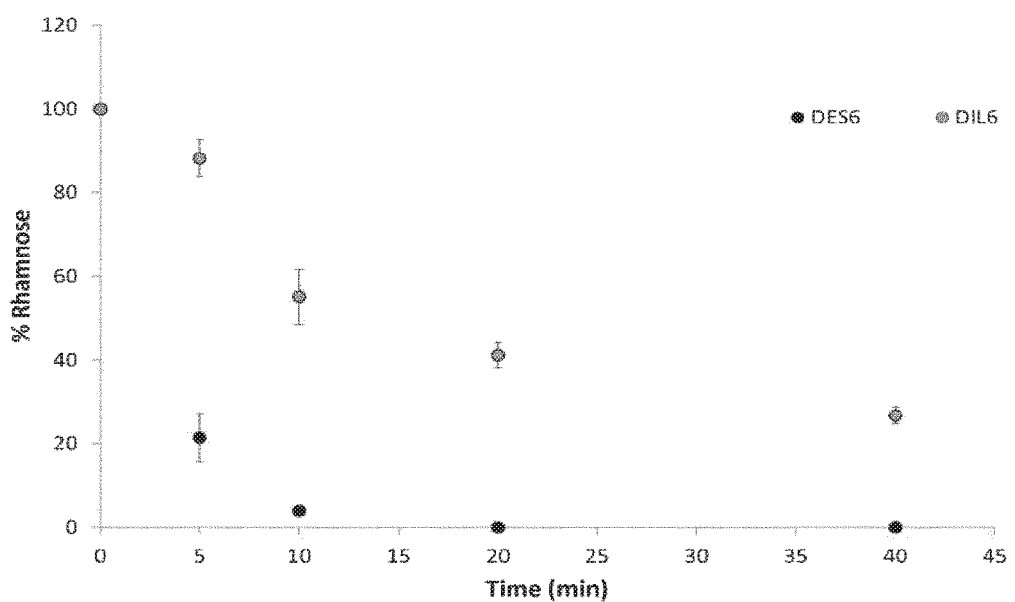
FIG. 9 shows the residual rhamnose in % from a reaction mixture formed from a deep eutectic solvent (DES6) and a reaction mixture with the same components prepared as a solution (DIL6).

Residual rhamnose (%) after different times at 120° C. is shown in FIG. 9. It can be seen that rhamnose was reacted more rapidly in the reaction mixture which was formed into a deep eutectic solvent before additional water was added, compared to the mixture which was directly formed as an aqueous solution. It is beneficial to accelerate the reaction of rhamnose as it is a precursor of furaneol, a key flavour active molecule contributing for example to the generation of caramel notes.

The invention claimed is:

1. A process for the preparation of a flavor composition comprising the steps:
   forming a deep eutectic solvent;
   preparing a reaction mixture comprising the deep eutectic solvent and flavor precursors selected from the group consisting of amino acids and peptides; and heating the reaction mixture to form aroma compounds, wherein the deep eutectic solvent is a liquid comprising a combination of at least two compounds solid at 25° C. and comprises water and/or glycerol in an amount insufficient to dissolve all the compounds solid at 25° C. individually, or in an amount such that all the compounds solid at 25° C. are simultaneously saturated at 25° C., wherein the flavor precursors comprise the compounds solid at 25° C., and wherein the at least two compounds solid at 25° C. are selected from the group consisting of: amino acids; organic acids having 6 carbons or fewer; monosaccharides or disaccharides; sugar alcohols having 12 carbons or fewer; choline chloride; betaine; carnitine; edible salts of sodium, potassium, magnesium or calcium; ribonucleotides; and urea; with the proviso that the two compounds are not both edible salts of sodium, potassium, magnesium or calcium; or are not both ribonucleotides.

2. The process according to claim 1 wherein the deep eutectic solvent is comprises a combination selected from the group consisting of: an amino acid with an organic acid having 6 carbons or fewer; an amino acid with a monosaccharide or disaccharide; and an amino acid with a sugar alcohol having 12 carbons or fewer.

3. The process according to claim 1 wherein the deep eutectic solvent is comprises a combination of a monosaccharide or disaccharide with a sugar alcohol having 12 carbons or fewer.

4. The process according to claim 1 wherein the deep eutectic solvent is based on a combination selected from the group consisting of a metal salt with a monosaccharide, a disaccharide and a sugar alcohol having 12 carbons or fewer.

5. The process according to claim 1 wherein the deep eutectic solvent is comprises a combination selected from the group consisting of β-alanine with malic acid; betaine with rhamnose; rhamnose with sorbitol; rhamnose with proline; xylose with cysteine; sorbitol with proline; sorbitol with lysine; sorbitol with cysteine; xylitol with proline; xylitol with lysine and sodium chloride with fructose.

6. The process according to claim 1 wherein the flavor precursors further comprise at least one polyol.

7. The process according to claim 1 wherein the flavor precursors are selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures of these.

8. The process according to claim 6 wherein the polyol is a reducing sugar.

9. The process according to claim 6 wherein the polyol is selected from the group consisting of glycerol; sorbitol; glucuronic acid; 5-keto-gluconic acid; galacturonic acid; iduronic acid; maltodextrin; glucose syrup; rhamnose; xylose; glucose; fructose; sucrose; lactose; maltose, xylitol, maltitol, erythritol, mannitol and mixtures of these.

10. The process according to claim 1 wherein a liquid solvent is added to the reaction mixture before heating, the liquid solvent being selected from the group consisting of water, glycerol, ethanol, polyethylene glycol and mixtures of these.

11. The process according to claim 1 wherein the reaction mixture further comprises an alkali.

12. A food product comprising a flavor composition obtained by a process comprising the steps:

forming a deep eutectic solvent;

preparing a reaction mixture comprising the deep eutectic solvent and flavor precursors selected from the group consisting of amino acids and peptides;

and heating the reaction mixture to form aroma compounds, wherein the deep eutectic solvent is a liquid comprising a combination of at least two compounds solid at 25° C. and comprises water and/or glycerol in an amount insufficient to dissolve all the compounds solid at 25° C. individually, or in an amount such that all the compounds solid at 25° C. are simultaneously saturated at 25° C., wherein the flavor precursors comprise the compounds solid at 25° C., and wherein the at least two compounds solid at 25° C. are selected from the group consisting of: amino acids; organic acids having 6 carbons or fewer; monosaccharides or disaccharides; sugar alcohols having 12 carbons or fewer; choline chloride; betaine; carnitine; edible salts of sodium, potassium, magnesium or calcium; ribonucleotides; and urea; with the proviso that the two compounds are not both edible salts of sodium, potassium, magnesium or calcium; or are not both ribonucleotides.

13. The food product according to claim 12 wherein the food product is selected from the group consisting of a bakery product, a pet food, a dairy product, a confectionery product, a cereal product and a culinary product.

* * * * *